United States Patent
Peden et al.

(10) Patent No.: US 8,775,404 B1
(45) Date of Patent: Jul. 8, 2014

(54) DYNAMIC POPULATING OF CONTACT LISTS WITH ADDITIONAL COMMUNICATION-APPLICATION USER IDENTIFIERS

(71) Applicant: Sprint Spectrum L.P., Overland Park, KS (US)

(72) Inventors: Mark Peden, Olathe, KS (US); Simon Youngs, Overland Park, KS (US); Gary D. Koller, Overland Park, KS (US); Raymond E. Reeves, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 13/631,000

(22) Filed: Sep. 28, 2012

(51) Int. Cl.
*G06F 17/30* (2006.01)

(52) U.S. Cl.
CPC .... *G06F 17/30424* (2013.01); *G06F 17/30864* (2013.01)
USPC ........... 707/709; 707/738; 707/769; 707/770; 707/812

(58) Field of Classification Search
CPC ................ G06F 17/30864; G06F 17/30424
USPC ............................ 707/769, 709, 738, 770, 812
See application file for complete search history.

(56) References Cited

U.S. PATENT DOCUMENTS

| | | | |
|---|---|---|---|
| 6,721,406 B1* | 4/2004 | Contractor ............... | 379/142.06 |
| 6,952,805 B1* | 10/2005 | Tafoya et al. ................. | 715/739 |
| 7,373,335 B2* | 5/2008 | Cleghorn et al. ..................... | 1/1 |
| 8,160,556 B2 | 4/2012 | Gosselin et al. | |
| 8,300,780 B1* | 10/2012 | Davis .......................... | 379/88.19 |
| 2003/0078981 A1* | 4/2003 | Harms et al. .................. | 709/206 |
| 2003/0158860 A1* | 8/2003 | Caughey ....................... | 707/200 |
| 2005/0198131 A1* | 9/2005 | Appelman et al. ............ | 709/204 |
| 2005/0288006 A1* | 12/2005 | Apfel ............................ | 455/418 |
| 2006/0046768 A1* | 3/2006 | Kirbas ........................ | 455/550.1 |
| 2007/0150444 A1* | 6/2007 | Chesnais et al. ................. | 707/3 |
| 2008/0242293 A1* | 10/2008 | Gosselin ........................ | 455/425 |
| 2008/0247531 A1* | 10/2008 | Borislow et al. ......... | 379/218.01 |
| 2009/0104895 A1* | 4/2009 | Kasturi et al. ............. | 455/414.1 |
| 2009/0254618 A1* | 10/2009 | Arnold et al. .................. | 709/206 |
| 2010/0075644 A1* | 3/2010 | Gosselin et al. .............. | 455/415 |
| 2010/0299352 A1* | 11/2010 | Price et al. .................... | 707/769 |
| 2010/0306185 A1* | 12/2010 | Smith et al. ................... | 707/709 |
| 2011/0096772 A1 | 4/2011 | Fronczak et al. | |
| 2011/0231407 A1* | 9/2011 | Gupta et al. .................. | 707/748 |
| 2012/0134352 A1* | 5/2012 | Vu ................................. | 370/347 |
| 2013/0014021 A1* | 1/2013 | Bau et al. ...................... | 715/739 |

OTHER PUBLICATIONS

PrivusMobile, My Digital Life, mydigitallife.info/privusmobile-discloses-caller-identity-based-on-calling-number-in-cellular-network/.

* cited by examiner

*Primary Examiner* — Shahid Alam
*Assistant Examiner* — Nargis Sultana (57) ABSTRACT

A wireless communication device (WCD) may receive a communication from an initiating party. The communication may be associated with a communication application, and may include a communication-application identifier that identifies the initiating party. The WCD may check whether a contacts list for the WCD contains user name data associated in the contacts list with the communication-application identifier. Upon determining that the contacts list does not contain such user name data, the WCD may querying a network server (NS) to request user name data associated with the communication-application identifier, receive from the NS a reply containing particular name data associated with the communication-application identifier along with additional communication-application user identifiers, each of which is also associated with the particular name data. The WCD may update the contacts list such that the particular name data is associated with the communication-application identifier along with the received additional communication-application identifiers.

20 Claims, 9 Drawing Sheets

DYNAMIC POPULATING OF CONTACT LISTS WITH ADDITIONAL COMMUNICATION-APPLICATION USER IDENTIFIERS

BACKGROUND

The use of wireless communication devices (WCDs) is becoming increasingly prevalent and popular in modern life. To provide wireless communication service to such WCDs (also often referred to as smart phones, client devices, user equipment, mobile stations, subscriber devices, access terminals, and the like), a wireless service provider typically operates a radio access network (RAN) that defines coverage areas in which subscribers' WCDs can be served by the RAN and obtain connectivity to other networks such as the public switched telephone network (PSTN) and the Internet. Using a WCD, a user is able to communicate in real-time with others. Such communication includes communications by voice, as well as data communications. RANs also provide WCDs with services such as text messaging (using a protocol or service such as the Short Message Service (SMS)) so that the user may be able to exchange, for example, text messages between the user of the WCD and others.

As the use of WCDs has grown, so too has the functionality of WCDs. These WCDs run a variety of mobile operating systems, such as Blackberry OS, iPhone OS, PALM OS®, WINDOWS MOBILE®, SYMBIAN OS®, and ANDROID®, just to name a few. WCDs now also support many different productivity, information, and entertainment applications. For instance, some popular mobile-phone platforms support e-mail, calendar, contact management, web browsing, navigation, location mapping, and gaming applications.

One typical application provided on a WCD is a phone book or contacts list utility application. This application allows for storing name data, mobile identification numbers, and user identifiers associated with various other communication applications, among other things, for a set of "contacts" that the user can thereafter use to engage in communication. Once the "contacts" are stored, communication may be made with a contact, for example, by selecting the contact using a user interface. Communication may also be received by the contact, upon which the WCD will notify the user of the WCD of the contact initiating the communication. The contact list is usually stored on the device and/or a server in a contacts file, list, or database and can be updated and edited by an authorized user.

OVERVIEW

Typically, when a WCD receives an inbound communication from an initiating party, that inbound communication will include a source identifier that is associated with the initiator of that communication. Upon receipt, the WCD will check its contacts list and determine whether it has name data associated with the source identifier from that inbound communication. Upon finding name data associated with that source identifier, the WCD will display the name data to identify to the user the initiating party.

At times, however, a WCD may receive an inbound communication from an initiating party, and upon checking the contacts list of the WCD, determine that it does not have name data associated with the source identifier from the inbound communication. This may be due to, for example, the fact that the WCD had not been contacted by the initiating party prior to the current communication, or the initiating party may be using an identifier or communication type not before used to contact the WCD, and therefore has not been associated with name data within the contacts list of the WCD. In such examples, the WCD is unable to display name data to the user, which may discourage or cause the user to ignore or terminate the incoming communication.

To address these problems as well as others, presently disclosed are systems and methods for dynamically populating a contacts list or phone book of a WCD during name-lookup to allow later lookup based on other identifiers.

One embodiment takes the form of a method carried out by a WCD. The WCD comprises a wireless communication interface, a processor, and a data storage containing program instructions executable by the processor for carrying out the method. The method includes receiving a first inbound communication from a first initiating party. The first inbound communication is associated with a first communication application, and the first inbound communication comprises a first-communication-application user identifier that identifies the first initiating party. The method also includes, responsive to receiving the first inbound communication, checking whether a contacts list for the WCD contains user name data associated in the contacts list with the first-communication-application user identifier, and determining that the contacts list does not contain such user name data.

The method additionally includes, responsive to determining that the contacts list does not contain such user name data, querying a network server to request user name data associated with the first-communication-application user identifier. The method further includes receiving from the network server a query reply containing particular name data that is associated with the first-communication-application user identifier. The query reply also contains one or more additional communication-application user identifiers, each of which is also associated with the particular name data. The method yet even further includes, after receiving the query reply, updating the contacts list such that the particular name data is then associated in the contacts list with the first-communication-application user identifier and also with at least one of the received additional communication-application user identifiers.

Another embodiment takes the form of the aforementioned WCD for carrying out the just described method.

Yet another embodiment takes the form of a method carried out by a computing system. The computing system comprises a wireless-communication interface, a processor, and data storage containing program instructions executable by the processor for carrying out the method. The method includes receiving from a given WCD a query request that contains a first-communication-application user identifier that is associated with a first communication application. The query request is requesting user name data associated with the first-communication-application user identifier.

The method further includes, responsive to receiving the query request, identifying one or more additional communication-application user identifiers as being associated with the first-communication-application user identifier. Each additional communication-application user identifier is respectively associated with a communication application other than the first communication application. The method also includes using one or more of the identified additional communication-application user identifiers to identify particular name data as being associated with the first-communication-application user identifier, and thereafter sending to the given WCD a query reply that contains the particular name data and that also contains one or more of the identified additional communication-application user identifiers for association by the given WCD of the particular name data with the first-communication-application user identifier and also with at least one of the sent additional communication-application user identifiers.

These as well as other aspects and advantages will become apparent to those of ordinary skill in the art by reading the following detailed description, with reference where appropriate to the accompanying drawings.

BRIEF DESCRIPTION OF THE DRAWINGS

Various example embodiments are described herein with reference to the following drawings, in which like numerals denote like entities, and in which.

DESCRIPTION

The present systems and methods will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

I. EXAMPLE COMMUNICATIONS SYSTEM

Figure 1:
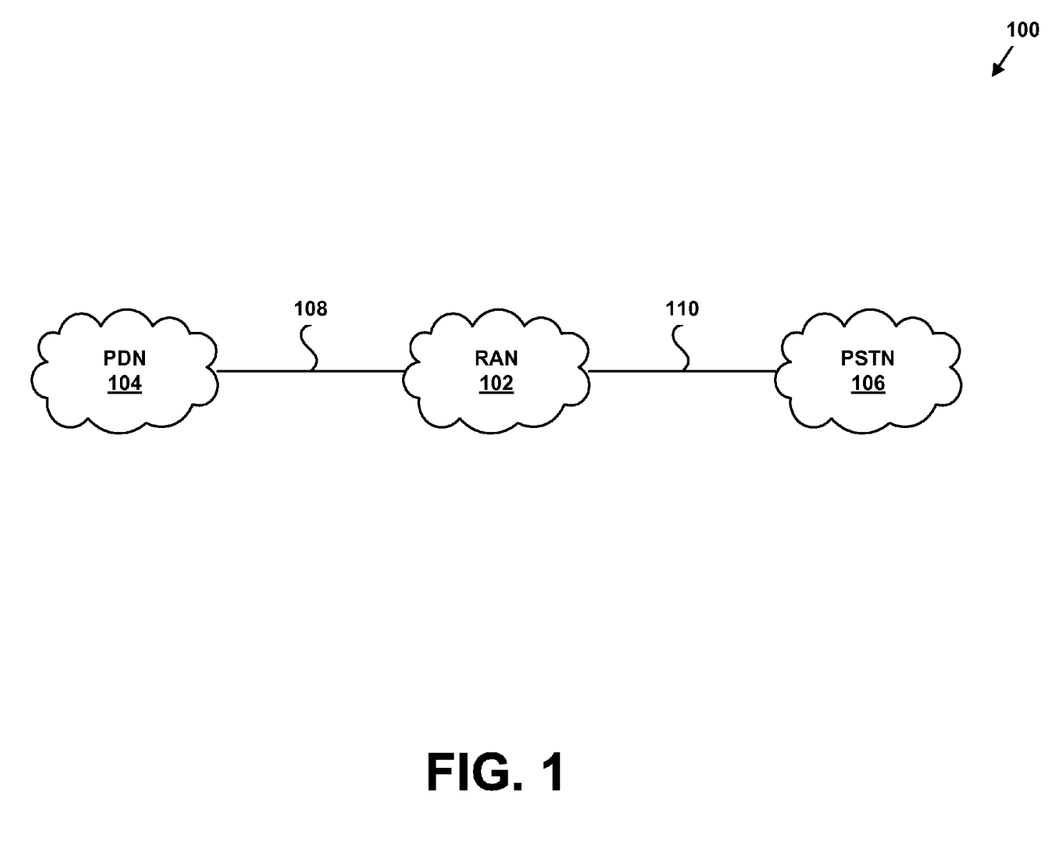
FIG. 1 is a simplified diagram depicting an example communication system in which the present methods can be implemented.

Referring to the drawings, FIG. 1 depicts a communication system 100 that includes a RAN 102, a packet-data network (PDN) 104, and a public switched telephone network (PSTN) 106. RAN 102 communicates with PDN 104 via a communication link 108, and with PSTN 106 via a communication link 110; either or both of these communications links may include one or more wired and/or wireless interfaces.

Figure 2:
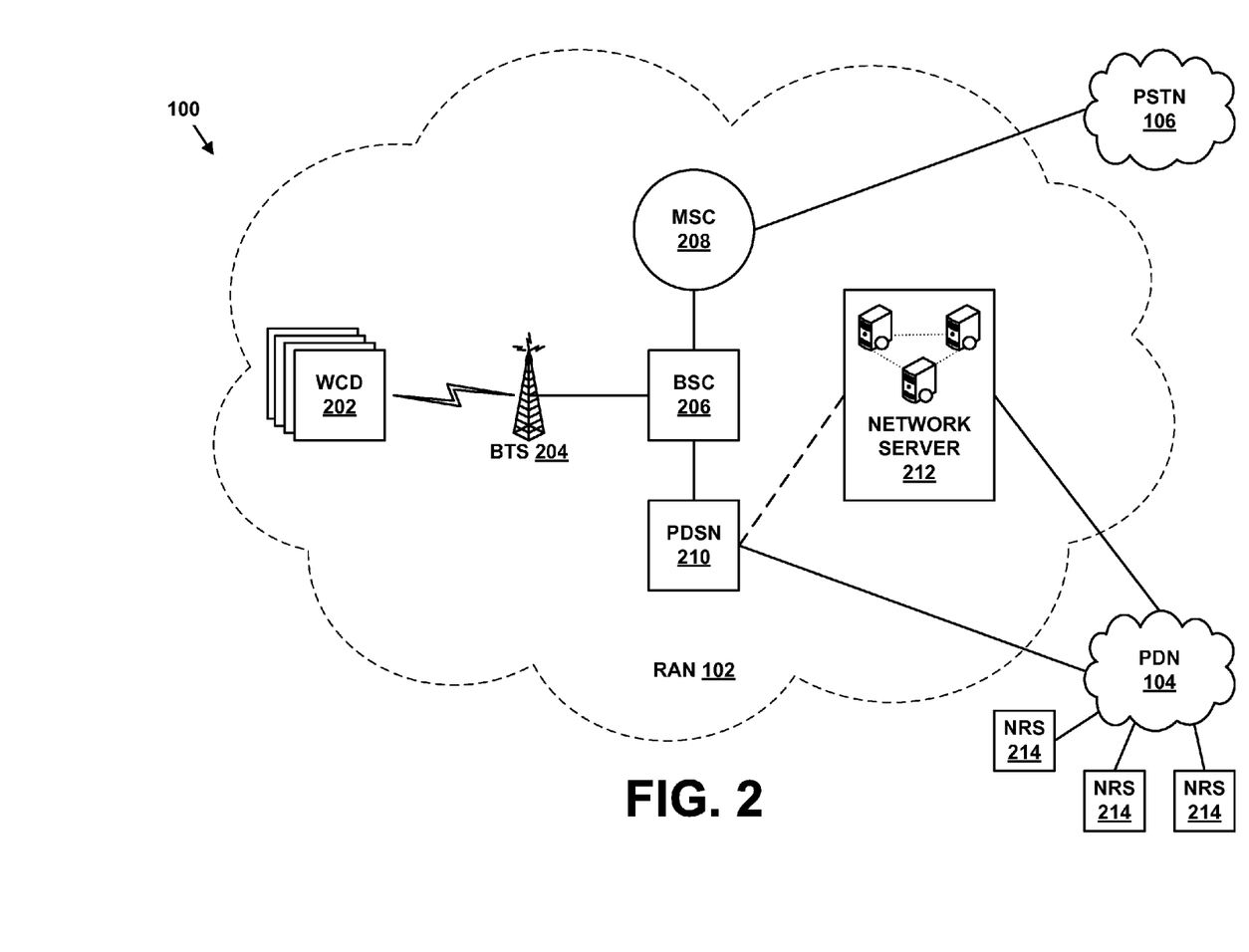
FIG. 2 is a simplified diagram depicting an example radio access network (RAN) in the context of the example communication system of FIG. 1.

FIG. 2 depicts communication system 100 with a more detailed depiction of RAN 102, which is shown in this example as including a plurality of WCDs 202, a base transceiver station (BTS) 204, a base station controller (BSC) 206, a mobile switching center (MSC) 208, a packet data serving node (PDSN) 210, and a Network Server (NS) 212. Additional entities could also be present; for example, there could be additional WCDs in communication with BTS 204; as another example, there could be additional entities in communication with PDN 104 other than Name Resolution Servers (NRSs) 214, and/or with PSTN 106. Also, there could be one or more routers, switches, and/or other devices or networks making up at least part of one or more of the communication links. And other variations are possible as well.

The WCDs 202 may be any devices arranged to carry out the WCD functions described herein. As such, a given WCD 202 may include a user interface, a wireless-communication interface or network interface, a processor, and data storage or memory containing instructions executable by the processor for carrying out those functions. The user interface may include buttons, a touchscreen, a microphone, and/or any other elements for receiving inputs, as well as a speaker, one or more displays, and/or any other elements for communicating outputs.

BTS 204 may be any network element arranged to carry out the BTS functions described herein. As such, BTS 204 may include a communication interface, a processor, and data storage containing instructions executable by the processor to carry out those functions. The communication interface may include one or more antennas, chipsets, and/or other components for providing one or more coverage areas such as cells and sectors, for communicating with WCDs 202 over an air interface. The communication interface may be arranged to communicate according to one or more protocols mentioned herein and/or any others now known or later developed. The communication interface may also include one or more wired and/or wireless interfaces for communicating with at least BSC 206.

BSC 206 may be any network element arranged to carry out the BSC functions described herein. As such, BSC 206 may include a communication interface, a processor, and data storage containing instructions executable by the processor to carry out those functions. The communication interface may include one or more wired and/or wireless interfaces for communicating with at least BTS 204, MSC 208, and PDSN 210. In general, BSC 206 functions to control one or more BTSs such as BTS 204, and to provide one or more BTSs such as BTS 204 with connections to devices such as MSC 208 and PDSN 210. Note that, as used herein, "base station" may mean a BTS, or may mean a combination of a BTS and a BSC. In general, the RAN 102 could include any number of BTSs communicating with any number of BSCs.

MSC 208 may be any networking element arranged to carry out the MSC functions described herein. As such, MSC 208 may include a communication interface, a processor, and data storage comprising instructions executable by the processor to carry out those MSC functions. The communication interface may include one or more wired and/or wireless interfaces for communicating with at least BSC 206 and PSTN 106. In general, MSC 208 functions as a switching element between PSTN 106 and one or more BSCs such as BSC 206, facilitating communication between mobile devices and PSTN 106, which may be the well-known public switched telephone network.

PDSN 210 may be any networking element arranged to carry out the PDSN functions described herein. As such, PDSN 210 may include a communication interface, a processor, and data storage comprising instructions executable by the processor for carrying out those PDSN functions. The communication interface may include one or more wired and/or wireless interfaces for communicating with at least BSC 206 and packet-data network 104. In general, packet-data network 104 functions as a network access server between packet-data network 104 and one or more BSCs such as BSC 206, facilitating packet-data communication between WCDs and packet-data network 104. PDSN 210 may also communicate with NS 212. With this arrangement WCD 202 may communicate with NRS 214 through a communication path comprising an air interface, BTS 204, BSC 206, PDSN 210, and packet-data network 104.

NS 212 may be any networking element arranged to carry out the NS functions described herein. As such, NS 212 may include a communication interface, a processor, and data storage comprising instructions executable by the processor for carrying out those NS functions. The communication interface may include one or more wired and/or wireless interfaces for communicating with at least PDSN 210 and packet-data network 104. With this arrangement WCD 202 may communicate with NS 212 through a communication path comprising air interface, BTS 204, BSC 206, PDSN 210, and/or packet-data network 104.

Note that many variations on example communication system 100 are possible. For example, although FIG. 2 explicitly shows only one BTS, one BSC, one MSC and one PDSN, communication system 100 could include multiples of these entities. That is, an MSC and/or PDSN could serve one or more BSCs, each BSC could serve one or more BTSs, and each BTS could radiate to provide one or more air interfaces in one or more respective coverage areas. As another example, the functional components of RAN 102 could be combined together in various ways. For instance, BTS 204 and BSC 206 could be combined together, and/or BSC 206 and MSC 208 could be combined together. As still another example, one or more of the functional components could be omitted altogether.

Thus, various components of RAN 102, including but not limited to BTS 204, BSC 206, PDSN 210, and NS 212 can work alone or in combination to carry out the functions of the present method, including those functions described below with respect to FIGS. 5 and 7. Which components are involved may depend on the particular network arrangement and air-interface protocol used.

II. EXAMPLE WIRELESS COMMUNICATION DEVICE

Figure 3:
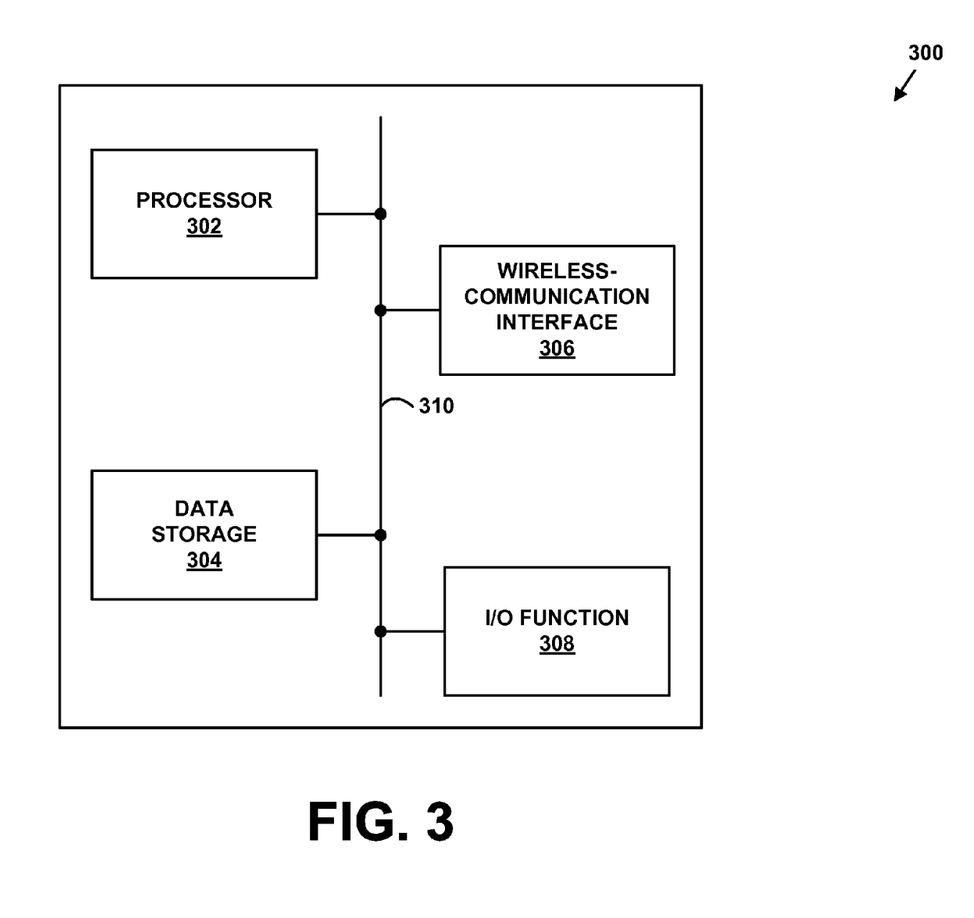
FIG. 3 is a simplified diagram depicting an example wireless communication device (WCD) that can be used to implement some of the present methods.

FIG. 3 is a simplified block diagram depicting an example WCD 300 that may be configured to operate in accordance with various embodiments. WCD 300 may be similar or identical to WCD 202 discussed in reference to FIG. 2. WCD 300 may be a cell phone, mobile phone, mobile data device, sensor device, laptop computer, personal computer or some other type of device that communicates with other communication devices via point-to-point links or via a network.

FIG. 3 also depicts some of the functional components that would likely be found in a WCD arranged to operate in accordance with the embodiments described herein. Example WCD 300 is depicted as including a processor 302, a data storage 304, a wireless-communication interface 306, and an input/output function 308, all of which may be coupled by a system bus 310 or similar mechanism.

Processor 302 may include one or more CPUs, such as one or more general purpose processors and/or one or more dedicated processors (e.g., application specific integrated circuits (ASICs) or digital signal processors (DSPs), etc.). Data storage 304, in turn, may comprise volatile and/or non-volatile memory and can be integrated in whole or in part with processor 302. Data storage 304 may hold program instructions executable by processor 302, and data that is manipulated by these instructions, to carry out various logic functions described herein. Alternatively, the logic functions can be defined by hardware, firmware, and/or any combination of hardware, firmware and software.

Data storage 304 may contain stored program logic that is executable by processor 302 to carry out the various WCD functions described herein. Additionally, data storage 304 may also contain program data as well as stored program logic. By way of example, the program data in data storage 304 may contain one or more stored contacts with user name data and one or more additional communication-application user identifiers.

Wireless-communication interface 306 may take the form of a wireless connection, perhaps operating according to Wi-Fi, IEEE 802.11, BLUETOOTH®, CDMA, WIMAX®, IDEN®, UMTS®, LTE®, or any other protocol or protocols used to communicate with other communication devices or a network. Other forms of physical-layer connections and other types of standard and/or proprietary communication protocols may be used over wireless-communication interface 306. Furthermore, wireless-communication interface 306 may comprise multiple physical and/or logical network interfaces, each capable of operating according to the same or different protocols.

Input/output function 308 facilitates user interaction with example WCD 300. Input/output function 308 may comprise multiple types of input devices, such as a keypad, a keyboard, a microphone, a mouse, a trackball, a dial, a touch screen, and so on. Similarly, input/output function 308 may comprise multiple types of output devices, such as a display screen, a speaker, a monitor, a printer, or one or more light emitting diodes (LEDs). Additionally or alternatively, example WCD 300 may support remote access from another device, via wireless communication interface 306 or via another interface (not shown), such an RS-232 port.

Input/output function 308 may be capable of presenting a contacts list or data from a contact of the contacts list to a user of WCD 300. Additionally, input/output function 308 may also be capable of receiving one or more commands from a user to edit, delete, or add contacts to the contacts list. Furthermore, the input/output function 308 is capable of initiating communication with other parties using the contacts stored in the contacts list. It should be understood that the exact input and output functions supported by WCD 300 can differ from the types of input and output functions listed above while still allowing WCD 300 to perform the embodiments described herein.

In addition to the components and functions discussed above, WCD 300 may support additional components and functions, including components and functions used to perform any of the methods described herein.

III. EXAMPLE NETWORK SERVER

Figure 4:
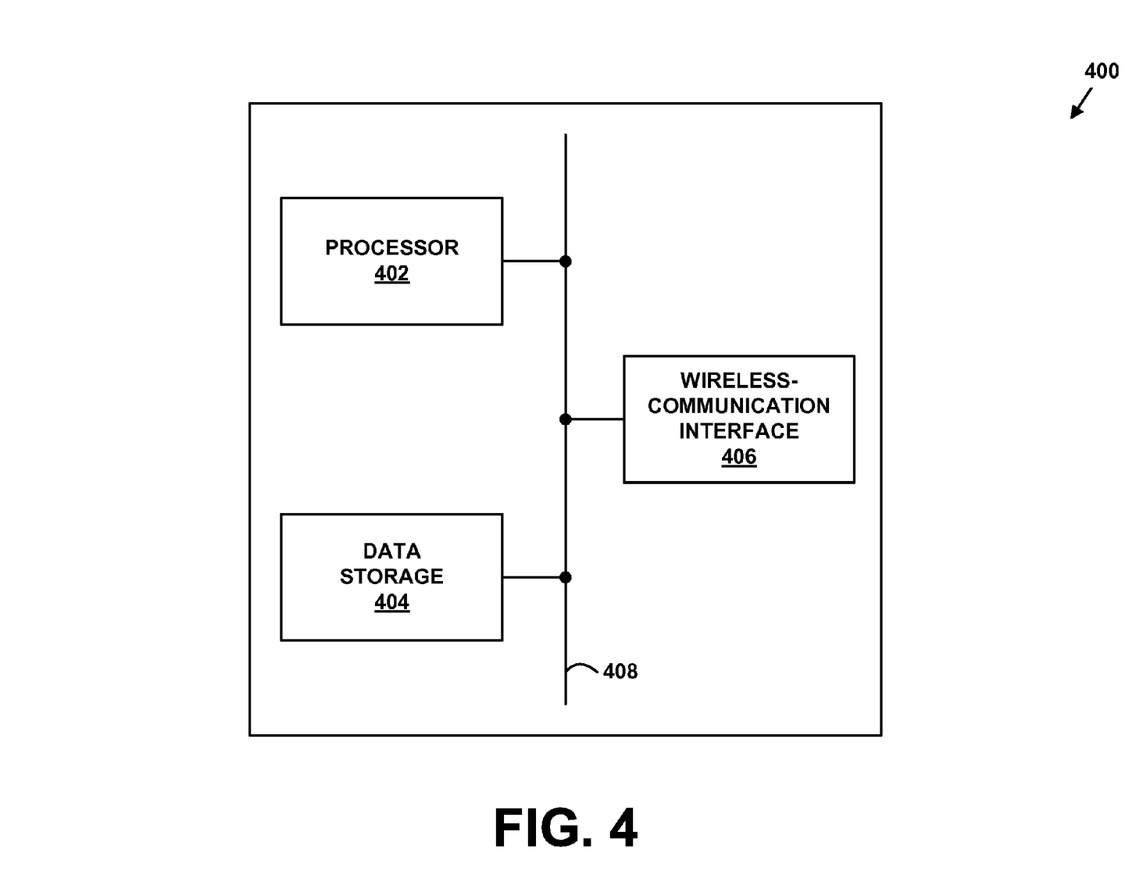
FIG. 4 is a simplified diagram depicting an example Network Server (NS) that can be used to implement some of the present methods.

FIG. 4 is a simplified block diagram depicting an example NS 400 that may be configured to operate in accordance with various embodiments. NS 400 may be similar or identical to NS 212 discussed with reference to FIG. 2, for example. The NS may be a personal computer, laptop computer, or some other type of device that communicates with other communication devices via point-to-point links or via a network. In a basic configuration, NS 400 may include one or more processors 402, data storage 404, and a wireless communication interface 406. A memory bus 408 can be used for communicating among the processor 402, data storage 404, and the wireless communication interface 406.

Processor 402 may include one or more CPUs, such as one or more general purpose processors and/or one or more dedicated processors (e.g., application specific integrated circuits (ASICs) or digital signal processors (DSPs), etc.). Data storage 404, in turn, may comprise volatile and/or non-volatile memory and can be integrated in whole or in part with processor 402. Data storage 404 may hold program instructions executable by processor 402, and data that is manipulated by these instructions, to carry out various logic functions described herein. Alternatively, the logic functions can be defined by hardware, firmware, and/or any combination of hardware, firmware, and software.

Data storage 404 may contain data as well as stored program logic, executable by processor 402, and capable of manipulating the data. By way of example, the data in data storage 404 may contain one or more stored contacts with user name data and one or more additional communication-application user identifiers. Additionally, data storage 404 may also contain stored program logic that is executable by processor 402 to carry out the various NS functions described herein.

Wireless-communication interface 406 may take the form of a wireless connection, perhaps operating according to IEEE 802.11 or any other protocol or protocols used to communicate with other communication devices or a network. Other forms of physical layer connections and other types of standard or proprietary communication protocols may be used over wireless communication interface 406. Furthermore, wireless communication interface 406 may comprise multiple physical or logical network interfaces, each capable of operating according to the same or different protocols.

In addition to the components and functions discussed above, NS 400 may support additional components and functions, including components and functions used to perform any of the methods described herein.

IV. EXAMPLE METHODS OF DYNAMICALLY POPULATING A CONTACTS LIST DURING NAME LOOK-UP

Figure 5:
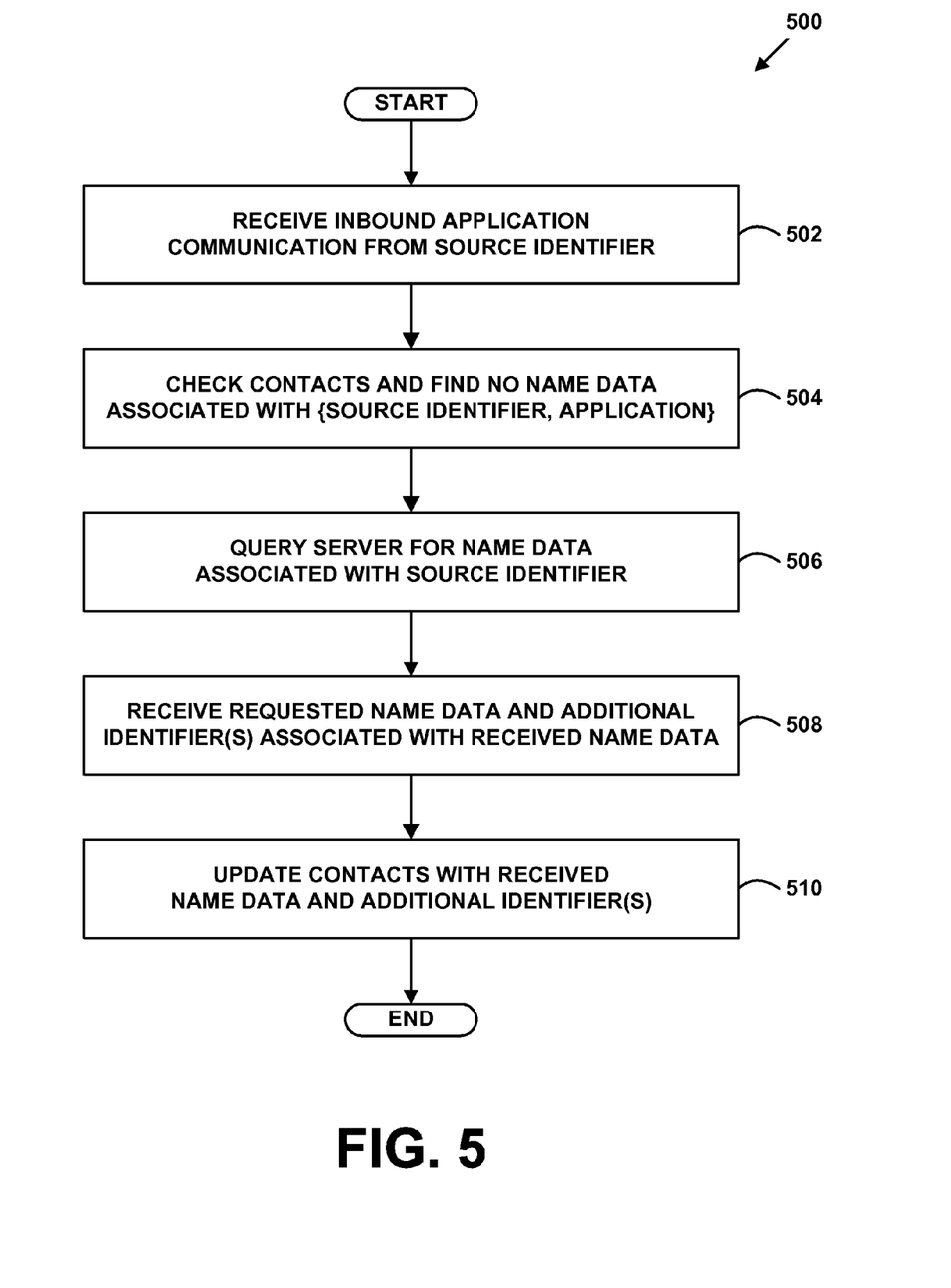
FIG. 5 is flowchart depicting functions that are carried out by a WCD in accordance with at least one embodiment.

FIG. 5 is a flowchart depicting in summary some of the functions that could be carried out by a WCD, such as the WCD 300, in accordance with an example method. Generally, method 500 of FIG. 5 involves dynamically populating a contacts list of a WCD. As shown in FIG. 5, at block 502, the WCD 300 receives a first inbound communication from a first initiating party. The inbound communication may be e-mail, messaging, or voice communication, for example. The first inbound communication may be associated with a first communication application, and the first inbound communication may comprise a first-communication-application user identifier that identifies the first initiating party. The initiating party may be any person or entity that desires to communicate with a user of the WCD, for example. The first-communication-application may be a voice-call application such as Voice over IP, an e-mail application such as Gmail®, or a messaging application (e.g., instant messaging or broadcast messaging). Example messaging applications may be AOL Instant Messenger® or Twitter®, for example. Other communication types are possible and contemplated herein. In some examples the communication application may simply be the communication itself, or in other words, some communications may not be associated with an application.

The first-communication-application user identifier may be any identifier used to identify a user of the first communication application, and may be associated with the first communication application. For example, referencing some of the aforementioned first communication application types, the voice-call application may utilize a voice-call-application identifier that may comprise one or more identifiers including a telephone number, a mobile identification number (MIN), a mobile directory number (MDN), a mobile station identifier (MSID), and an international mobile subscriber identity number (IMSI). In another example, the e-mail application may utilize an email address as a first-communication-application user identifier. In further examples, the messaging application may utilize an IM user identifier or a broadcasting messaging-application user identifier such as a Twitter® name. In the instance where the communication may not be associated with an application, the user identifier may be a hardware identifier of the initiating WCD. It is noted that other first-communication-application user identifiers may be used and, in some cases, multiple identifiers may be used to identify the initiating party. In one particular example, herein after referred to as the push-to-talk (PTT) example, a user of a WCD may receive a communication from a friend using a PTT application, and the first-communication-application user identifier that identifies the initiating party may be a universal fleet member identifier (UFMI).

Figure 6A:
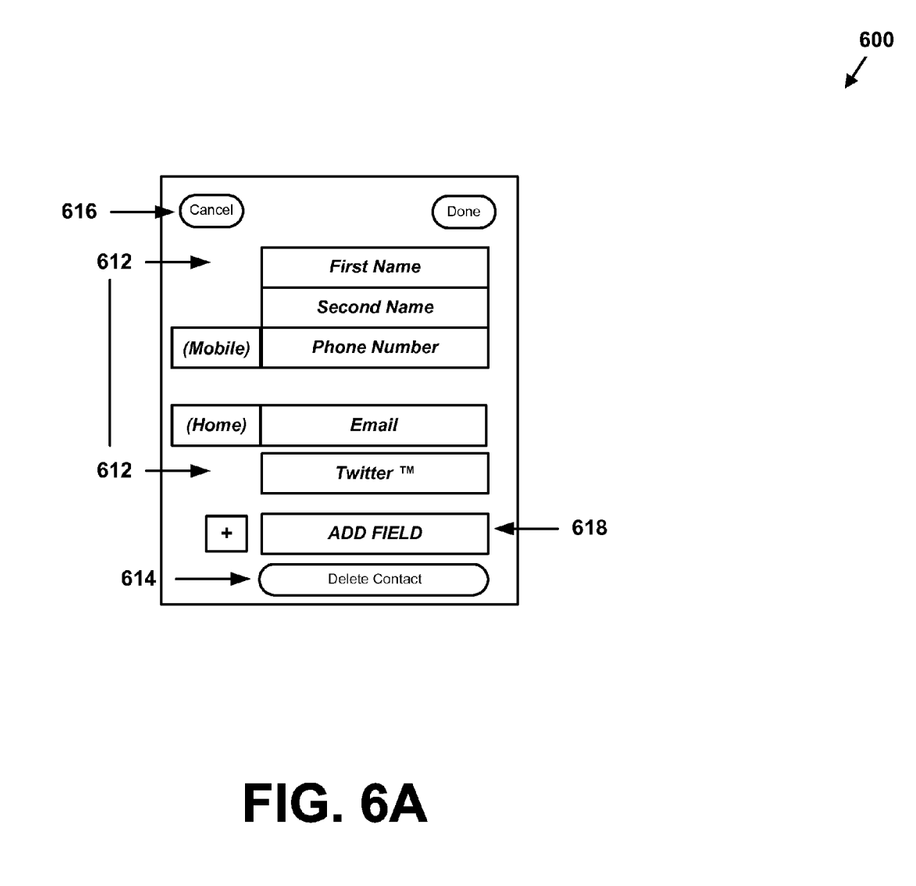
FIG. 6A is a simplified diagram depicting an example contacts list.

At block 504, responsive to receiving the first inbound communication, WCD 300 may check whether a contacts list for the WCD contains user name data associated in the contacts list with the first-communication-application user identifier, and determine that the contacts list does not contain such user name data. The user name data may comprise name data that corresponds to a particular person or organization, for example. In other examples, the user name data may be a pseudonym for a particular person or organization that was edited by a user. FIG. 6A illustrates a contacts list 600 that is empty, or in other words has no data, including having no user name data, associated with the first-communication-application user identifier. FIG. 6A is discussed in more detail later. Alternatively, a contacts list 600 may have some data associated with the first-communication-application user identifier, but no user name data.

To check whether a contacts list for the WCD contains user name data associated in the contacts list with the first-communication-application user identifier, and determine that the contacts list does not contain such user name data, the WCD 300 may query a contacts application associated with the WCD and receive a reply indicating that the contacts list does not contain such user name data. Other methods to may be used to check a contacts list for the WCD for user name data and are contemplated herein.

At block 506, responsive to determining that the contacts list does not contain such user name data, WCD 300 may query a NS to request the user name data associated with the first-communication-application user identifier. The NS may be the NS described with respect to FIGS. 2 and 4, for example. To query the NS, the WCD 300 may, for example, send to the NS a query request that comprises the first-communication-application user identifier and that identifies the first communication application. Other methods may be used to query the NS.

At block 508, the WCD 300 may receive from the network server a query reply containing particular name data that is associated with the first-communication-application user identifier. The query reply may also contain one or more additional communication-application user identifiers, each of which is also associated with the particular name data. For example, the WCD 300 may receive any of the communication-application user identifiers discussed with regard to step 502 (e.g., an e-mail address for an e-mail communication application) as additional communication-application user identifiers.

Figure 6B:
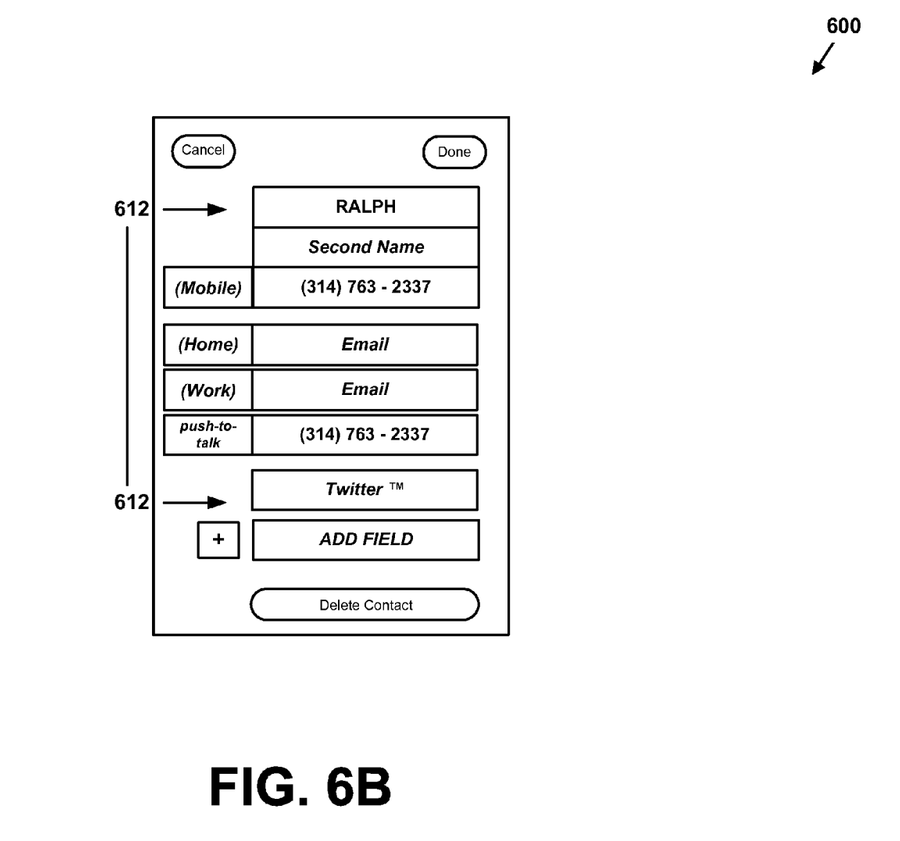
FIG. 6B is a simplified diagram depicting an example contacts list after it has been dynamically populated.

At block 510, after receiving the query reply, the WCD 300 may update the contacts list of the WCD 300 such that the particular name data is then associated in the contacts list with the first-communication-application user identifier and also with at least one of the received additional communication-application user identifiers. In some examples, to update the contacts list, the WCD 300 may update the contacts list such that the particular name data is then associated in the contacts list with the first-communication-application user identifier and also with all of the received additional communication-application user identifiers. FIG. 6B illustrates a contacts list or phone book 600 that has particular name data that is associated with additional communication application user identifiers. FIG. 6B is discussed in more detail later. In some examples, once the particular name data has been obtained, the WCD 300 may present the particular name data on a user interface of the WCD, using input/output function 308, in connection with the receipt of the inbound communication. In other words, the WCD 300 may display the particular name data after receiving the inbound communication.

Referring back to the PTT example, the user of the WCD may not have name data associated with the incoming UMFI. Accordingly, the user's WCD may perform steps 504 through 510, for example, and obtain particular name data associated with the UMFI as well as additional identifiers associated with the UMFI, such as a Twitter® name identifier, for example. The user's WCD may store this information in a contacts list and associate it together. Having the particular name data and the Twitter® name identifier now associated, the user's WCD may present the particular name data on the WCD when the WCD receives a messaging communication associated with the Twitter® name identifier.

More generally, in some embodiments, the at least one of the received additional communication-application user identifiers may include a second-communication-application user identifier. In such an instance, after updating the contacts list, the WCD 300 may receive a second inbound communication that is associated with a second communication application and that comprises the second-communication-application user identifier as an indication of an initiating party of the second inbound communication. In response to receiving the second inbound communication, the WCD 300 may check whether the contacts list, such as the contacts list shown in FIG. 6A, contains user name data that is associated in the contacts list with the second-communication-application user identifier, and determine that the contacts list contains the particular name data associated in the contacts list with the second-communication-application user identifier. Once the WCD 300 has determined that the contacts list contains the particular name data associated in the contacts list with the second-communication-application user identifier, the WCD 300 may present the particular name data on a user interface—using, for example, input/output function 308—of the WCD 300 in connection with the receipt of the second inbound communication.

Figure 7:
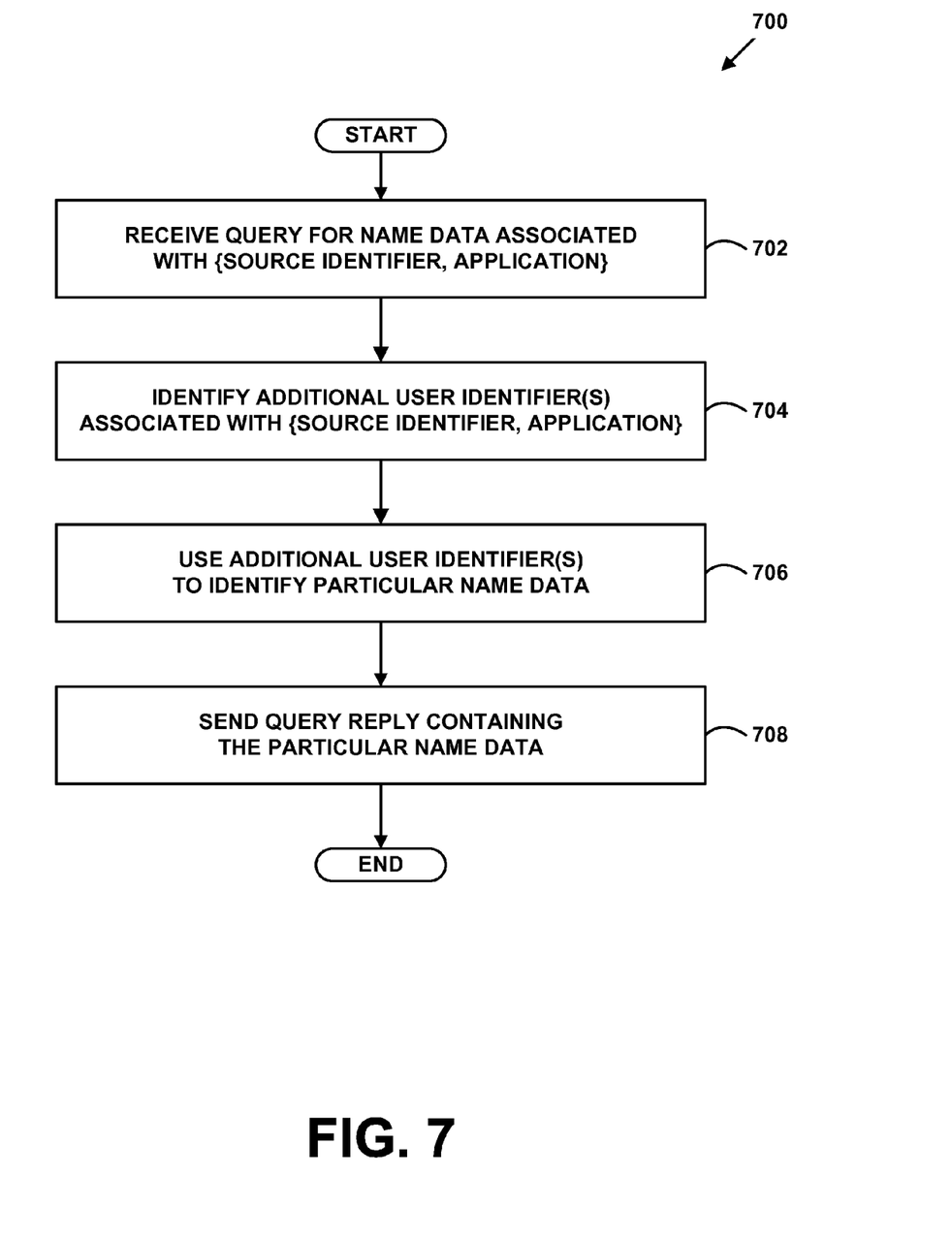
FIG. 7 is a flowchart depicting functions that are carried out by a NS in accordance with at least one embodiment.

An alternative method 700 for dynamically populating a contacts list or phone book of a WCD is depicted in FIG. 7. In FIG. 7, at step 702, an NS, such as the NS 400 depicted in FIG. 4 receives from a given WCD, such as WCD 300, a query request that contains a first-communication-application user identifier that is associated with a first communication application. The query request may request user name data associated with the first-communication-application user identifier. The first-communication-application user identifier may be any identifier discussed with regard to method 500, for example, or any other.

At step 704, in response to receiving the query request, the NS 400 identifies one or more additional communication-application user identifiers as being associated with the first-communication-application user identifier. Each additional communication-application user identifier may be respectively associated with a communication application other than the first communication application. To identify one or more additional communication-application user identifiers, the NS 400 may query mapping data that correlates the first-communication-application user identifier with the given additional communication-application user identifier. For example, referring to the PTT example, the given additional communication-application user identifier may be a voice-call-application user identifier, and the mapping data may correlate the PTT user identifier with voice-call-application user identifiers (e.g., phone numbers). In this case the UMFI may be mapped to any of the user identifiers discussed above with regard to the voice-call application (e.g., an MDN).

At step 706, the NS 400, using one or more of the identified additional communication-application user identifiers, identifies particular name data as being associated with the first-communication-application user identifier, and thereafter sends to the given WCD a query reply that contains the particular name data and that also contains one or more of the identified additional communication-application user identifiers for association by the given WCD of the particular name data with the first-communication-application user identifier and also with at least one of the sent additional communication-application user identifiers.

Using a given additional communication-application user identifier to identify the particular name data as being associated with the first-communication-application user identifier may include querying one or more NRSs associated with the communication application that is associated with the given additional communication-application user identifier to obtain name data associated with the given additional communication-application user identifier.

The NRS to be queried may be selected, for example, based on one or more strategies selected from a group of strategies. The group of strategies may include (i) respective recentness of use among the identified additional communication-application user identifiers, (ii) respective frequency of use among the identified additional communication-application user identifiers, (iii) respective total amount of use among the identified additional communication-application user identifiers, (iv) respective routing costs to various NRSs, and (v) respective reliability of various NRSs. Other strategies may be used as well or instead to determine which NRS to query.

V. EXAMPLE CONTACTS LIST ARRANGEMENTS

Figure 6C:
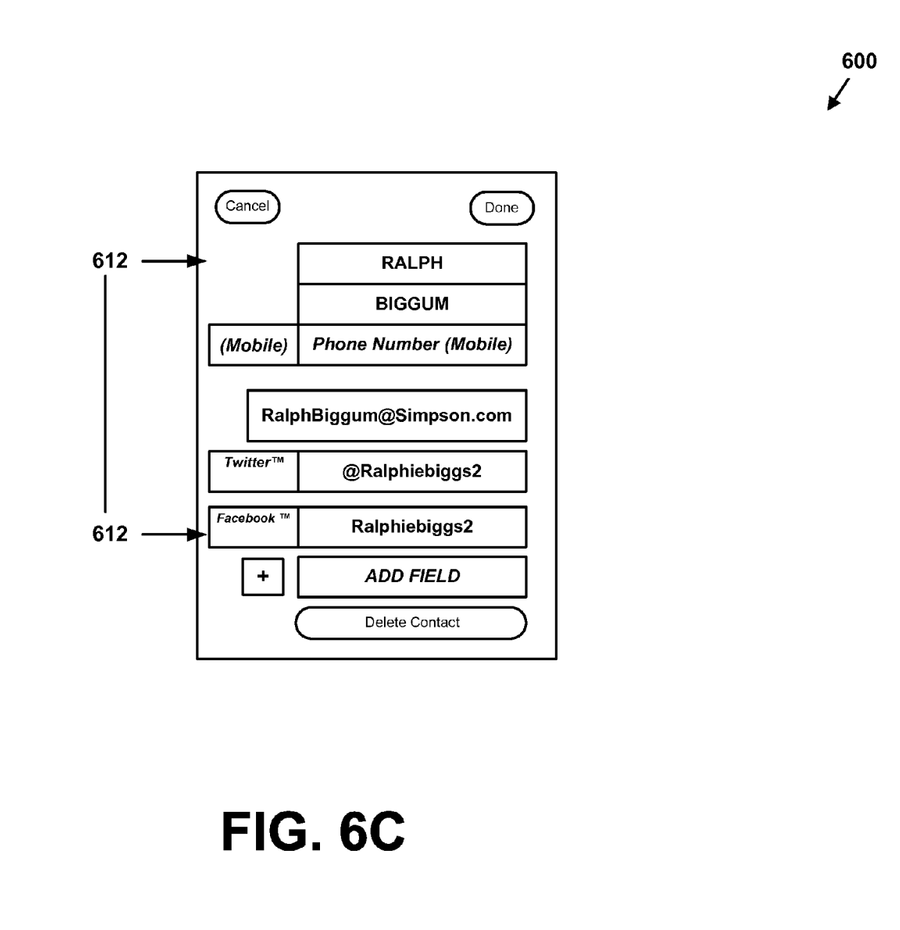
FIG. 6C is another simplified diagram depicting an example contacts list after it has been dynamically populated.

As stated above, a WCD, such as WCD 300, may have varying amounts of data in a contacts list or phone book of the WCD. FIGS. 6A, 6B and 6C each depict an example contacts list, each having a different amount of data. While each of the contact lists depicted in FIGS. 6A, 6B, and 6C contain a few amount of data items, a contact list may contain as little as one data item, or may contain an arbitrarily large number of data items.

FIG. 6A depicts an example contacts list. In FIG. 6A the contacts list 600 comprises multiple data fields 612 representing the types of data that may be stored in the contacts list. For example, in FIG. 6 the contacts list 600 comprises a first name data field, a last name data field, a mobile telephone number data field, an e-mail data field, and a Twitter™ data field. In contacts list 600, the only data field with populated data is the mobile telephone number filed 612 (shown as "(314)763-2337"). The contacts list may also comprise an add field option allowing a user of the WCD to add more data fields to associate with the contact list. The contacts list 600 may also comprise menu buttons 616 to navigate in and out of the contacts list 600, or a delete button 614 to delete the contact.

Within the context of this disclosure, the data fields 612 may be used as identifiers for a communication type, and may be associated with each other. For example, an e-mail address populated in the e-mail data field may associated with an email-application and the e-mail may identify an initiating or receiving party when using the e-mail application. The contacts list 600 may be comprised of data fields that represent any of the communication types and identifiers discussed with regard to method 500, for example. In one instance, the mobile phone number data field may receive a telephone number, which may be associated with a voice-call application and identify a person or organization that initiates or receives the voice-call communication with the WCD containing this contact, for example. In FIG. 6A there are no populated data fields.

FIG. 6B depicts the contacts list of FIG. 6A but updated or in a different state. The different state may be as a result of a WCD performing the methods described herein, for example. In FIG. 6B, two new fields have been added, a new work-email field and a push-to-talk field, and more of the data fields 612 have been populated. For example, the telephone number data filed has been populated (shown as "(314)763-2337"), the first name data field has been populated (shown as "RALPH"), and push-to-talk identifier has been populated (shown as "(314)763-2337"). In this example, the push-to-talk application identifier and the voice-call application identifier are the same. Accordingly, in the contacts list 600 of FIG. 6B, the telephone number, "(314)763-2337", is now associated with both a voice-call application and used to identity an initiating party using a voice-call application, and a PTT application and used to identify an initiating party using a PTT application. However, in other configurations, the PTT application identifier and the voice-call application identifier may not be the same.

Moreover, because the first name data field has been populated (shown as "RALPH"), the name Ralph is now associated with the telephone number data field identifier (i.e., "(314)763-2337") and the PTT data field identifier (i.e., "(314)763-2337"). Accordingly, whenever a voice-call communication or PTT communication is initiated or received by the WCD, the WCD may display the first name, in this instance RALPH, during the communication. As another example, FIG. 6C represents a contact list entry with several filled data fields associated with one another. The contact in FIG. 6C may have been populated using the methods described with respect to method 500 and 700, for example.

V. CONCLUSION

Example embodiments have been described above. Those skilled in the art will understand, however, that changes and modifications may be made to these embodiments without departing from the true scope and spirit of the invention, which is defined by the claims.

What is claimed is:

1. A method carried out by a wireless communication device (WCD) that comprises a wireless-communication interface, a processor, and data storage containing program instructions executable by the processor for carrying out the method, which comprises:
receiving a first inbound communication that is associated with a first communication application and that comprises a first-communication-application user identifier as an indication of an initiating party of the first inbound communication;
responsive to receiving the first inbound communication, checking whether a contacts list for the WCD contains user name data that is associated in the contacts list with the first-communication-application user identifier, and determining that the contacts list does not contain such user name data;
responsive to determining that the contacts list does not contain such user name data, querying a network server to request user name data that is associated with the first-communication-application user identifier;
receiving from the network server a query reply that contains particular name data that is associated with the first-communication-application user identifier and that also contains one or more additional communication-application user identifiers, each of which is also associated with the particular name data; and
after receiving the query reply, updating the contacts list such that the particular name data is then associated in the contacts list with the first-communication-application user identifier and also with at least one of the received additional communication-application user identifiers.

2. The method of claim 1, wherein the first communication application is a push-to-talk (PTT) application, wherein the first-communication-application user identifier is a PTT user identifier, and wherein the PTT user identifier is a universal fleet member identifier (UFMI).

3. The method of claim 1, wherein the first communication application is a voice-call application, wherein the first-communication-application user identifier is a voice-call-application user identifier, and wherein the voice-call-application user identifier comprises one or more identifiers selected from a group of identifiers, the group consisting of a telephone number, a mobile identification number (MIN), a mobile directory number (MDN), a mobile station identifier (MSID), and an international mobile subscriber identity (IMSI).

4. The method of claim 1, wherein the first communication application is an e-mail application, and wherein the first-communication-application user identifier is an e-mail address.

5. The method of claim 1, wherein the first communication application is a messaging application, and wherein the first-communication-application user identifier is a messaging-application user identifier.

6. The method of claim 5, wherein the messaging application is at least one of an instant-messaging (IM) application or a broadcast-messaging application, and wherein the messaging-application user identifier is at least one of an IM user identifier or a broadcast-messaging-application user identifier.

7. The method of claim 1, wherein:
checking whether the contacts list for the WCD contains user name data that is associated in the contacts list with the first-communication-application user identifier comprises querying a contacts application, and
determining that the contacts list does not contain such user name data comprises receiving from the contacts application a reply indicating that the contacts list does not contain such user name data.

8. The method of claim 1, wherein querying the network server to request user name data that is associated with the first-communication-application user identifier comprises sending to the network server a query request that comprises the first-communication-application user identifier and that also identifies the first communication application.

9. The method of claim 1, wherein the particular name data corresponds to at least one of a particular person or a particular organization.

10. The method of claim 1, wherein at least one of the received additional communication-application user identifiers comprises an identifier selected from a group of identifiers, the group consisting of a push-to-talk (PTT) user identifier, a universal fleet member identifier (UFMI), a voice-call-application user identifier, a telephone number, a mobile identification number (MIN), a mobile directory number (MDN), a mobile station identifier (MSID), an international mobile subscriber identity (IMSI), an e-mail address, a messaging-application user identifier, an instant-messaging (IM) user identifier, and broadcast messaging-application user identifier.

11. The method of claim 1, wherein updating the contacts list such that the particular name data is then associated in the contacts list with the first-communication-application user identifier and also with at least one of the received additional communication-application user identifiers comprises updating the contacts list such that the particular name data is then associated in the contacts list with the first-communication-application user identifier and also with all of the received additional communication-application user identifiers.

12. The method of claim 1, further comprising:
querying the updated contacts list to obtain the particular name data for presentation on the user interface of the WCD in connection with the receipt of the first inbound communication; and
presenting the particular name data on a user interface of the WCD in connection with the receipt of the first inbound communication.

13. The method of claim 1, wherein the at least one of the received additional communication-application user identifiers includes a second-communication-application user identifier, the method further comprising:
after updating the contacts list, receiving a second inbound communication that is associated with a second communication application and that comprises the second-communication-application user identifier as an indication of an initiating party of the second inbound communication;
responsive to receiving the second inbound communication, checking whether the contacts list contains user name data that is associated in the contacts list with the second-communication-application user identifier, and determining that the contacts list contains the particular name data associated in the contacts list with the second-communication-application user identifier; and
responsive to determining that the contacts list contains the particular name data associated in the contacts list with the second-communication-application user identifier, presenting the particular name data on a user interface of the WCD in connection with the receipt of the second inbound communication.

14. A wireless communication device (WCD) comprising:
a wireless-communication interface;
a processor; and
data storage containing program instructions executable by the processor for carrying out a set of functions, wherein the set of functions comprises:
receiving a first inbound communication that is associated with a first communication application and that comprises a first-communication-application user identifier as an indication of an initiating party of the first inbound communication;
responsive to receiving the first inbound communication, checking whether a contacts list for the WCD contains user name data that is associated in the contacts list with the first-communication-application user identifier, and determining that the contacts list does not contain such user name data;
responsive to determining that the contacts list does not contain such user name data, querying a network server to request user name data that is associated with the first-communication-application user identifier;
receiving from the network server a query reply that contains particular name data that is associated with the first-communication-application user identifier and that also contains one or more additional communication-application user identifiers, each of which is also associated with the particular name data; and
after receiving the query reply, updating the contacts list such that the particular name data is then associated in the contacts list with the first-communication-application user identifier and also with at least one of the received additional communication-application user identifiers.

15. A method carried out by a computing system, wherein the computing system comprises a wireless-communication interface, a processor, and data storage containing program instructions executable by the processor for carrying out the method, which comprises:
receiving from a given WCD a query request that contains a first-communication-application user identifier that is associated with a first communication application, wherein the query request is requesting user name data associated with the first-communication-application user identifier;
responsive to receiving the query request, identifying one or more additional communication-application user identifiers as being associated with the first-communication-application user identifier, wherein each additional communication-application user identifier is respectively associated with a communication application other than the first communication application;
using one or more of the identified additional communication-application user identifiers to identify particular name data as being associated with the first-communication-application user identifier, and thereafter sending to the given WCD a query reply that contains the particular name data and that also contains one or more of the identified additional communication-application user identifiers for association by the given WCD of the particular name data with the first-communication-application user identifier and also with at least one of the sent additional communication-application user identifiers.

16. The method of claim 15, wherein:
the first-communication-application user identifier comprises one or more identifiers selected from a group of identifiers, the group consisting of a push-to-talk (PTT) user identifier, a universal fleet member identifier (UFMI), a voice-call-application user identifier, a telephone number, a mobile identification number (MIN), a mobile directory number (MDN), a mobile station identifier (MSID), an international mobile subscriber identity (IMSI), an e-mail address, a messaging-application user identifier, an instant-messaging (IM) user identifier, and broadcast messaging-application user identifier, and at least one of the identified additional communication-application user identifiers comprises an identifier selected from a group of identifiers, the group consisting of a push-to-talk (PTT) user identifier, a universal fleet member identifier (UFMI), a voice-call-application user identifier, a telephone number, a mobile identification number (MIN), a mobile directory number (MDN), a mobile station identifier (MSID), an international mobile subscriber identity (IMSI), an e-mail address, a messaging-application user identifier, an instant-messaging (IM) user identifier, and broadcast messaging-application user identifier.

17. The method of claim 15, wherein, as to one or more of the identified additional communication-application user identifiers, identifying a given additional communication-application user identifier as being associated with the first-communication-application user identifier comprises querying mapping data that correlates the first-communication-application user identifier with the given additional communication-application user identifier.

18. The method of claim 17, wherein the first-communication-application user identifier is a push-to-talk (PTT) user identifier, the given additional communication-application user identifier is a voice-call-application user identifier, and the mapping data correlates PTT user identifiers with voice-call-application user identifiers.

19. The method of claim 15, wherein, as to one or more of the identified additional communication-application user identifiers, using a given additional communication-application user identifier to identify the particular name data as being associated with the first-communication-application user identifier comprises querying one or more name resolution servers (NRSs) associated with the communication application that is associated with the given additional communication-application user identifier to obtain name data associated with the given additional communication-application user identifier.

20. The method of claim 19, further comprising selecting at least one NRS to be queried based at least in part on at least one of:
    an identity of the first communication application, or
    one or more strategies selected from a group of strategies, the group consisting of (i) respective recentness of use among the identified additional communication-application user identifiers, (ii) respective frequency of use among the identified additional communication-application user identifiers, (iii) respective total amount of use among the identified additional communication-application user identifiers, (iv) respective routing costs to various NRSs, and (v) respective reliability of various NRSs.

* * * * *